United States Patent [19]

Barabas et al.

[11] 3,978,163

[45] Aug. 31, 1976

[54] GRAFT COPOLYMERS OF A POLY (N-VINYL LACTAM) CONTAINING/UNSATURATED ETHYLENIC/ AND DIBASIC CARBOXYLIC ACID MONOESTER SIDECHAINS AND STABLE EMULSIONS OF SUCH GRAFT COPOLYMERS

[75] Inventors: Eugene S. Barabas, Watchung; Marvin M. Fein, Westfield, both of N.J.

[73] Assignee: GAF Corporation, New York, N.Y.

[22] Filed: Feb. 12, 1975

[21] Appl. No.: 549,207

Related U.S. Application Data

[63] Continuation of Ser. Nos. 313,138, Dec. 7, 1972, abandoned, and Ser. No. 322,560, Jan. 10, 1973, abandoned.

[52] U.S. Cl. .................. 260/885; 260/29.6 RW; 260/29.6 WB; 260/878 R; 260/882; 260/884; 260/886
[51] Int. Cl.² .................. C08L 31/02; C08L 25/18
[58] Field of Search .......... 260/878, 882, 884, 885, 260/886, 29.6 RW, 29.6 WB

[56] References Cited
UNITED STATES PATENTS

| | | | |
|---|---|---|---|
| 3,467,613 | 9/1969 | Barabas et al. | 260/29.6 RW |
| 3,468,832 | 9/1969 | Barabas et al. | 260/29.6 RW |
| 3,488,312 | 1/1970 | Barabas et al. | 260/29.6 RW |
| 3,635,868 | 1/1972 | Barabas et al. | 260/29.6 RW |
| 3,686,150 | 8/1972 | Barabas et al. | 260/885 |
| 3,691,125 | 9/1972 | Barabas et al. | 260/29.6 WB |
| 3,819,559 | 6/1974 | Barabas | 260/29.6 WB |

*Primary Examiner*—Murray Tillman
*Assistant Examiner*—W. C. Danison, Jr.
*Attorney, Agent, or Firm*—Walter C. Kehm; James N. Blauvelt

[57] ABSTRACT

There is disclosed a graph copolymer derived from a monomer mixture comprising a. a monomer having the formula

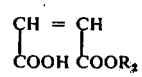

wherein $R_2$ is a substituted or unsubstituted hydrocarbon group and b. an unsaturated ethylenic monomer having the formula

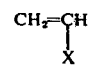

p wherein X is an ester, aldehyde, ketone, halogen, ether, nitrile, isocyanate, sulfate and its salts, an N-containing heterocycle, or an aromatic hydrocarbon, graft polymerized on a poly (N-vinyl lactam) substrate, a stable aqueous emulsion containing same and a method of production therefor.

8 Claims, No Drawings

GRAFT COPOLYMERS OF A POLY (N-VINYL LACTAM) CONTAINING/UNSATURATED ETHYLENIC/ AND DIBASIC CARBOXYLIC ACID MONOESTER SIDECHAINS AND STABLE EMULSIONS OF SUCH GRAFT COPOLYMERS

CROSS-REFERENCE TO RELATED APPLICATIONS

This is a continuation of applicaton Ser. No. 313,138, filed Dec. 7, 1972, now abandoned, and of application Ser. No. 322,560, filed Jan. 10, 1973, now abandoned.

BACKGROUND OF THE INVENTION

The present invention relats in general to graft terpolymers and stable aqueous emulsions thereof and, in particular, to stable, aqueous dispersions or latices containing dispersed particles comprising a polymeric N-vinyl lactam having grafted thereon as side chains, units of an alkyl ester of an $\alpha$-$\beta$-unsaturated carboxylic acid and a monoacid ester of an unsaturated dibasic acid.

Graft copolymers comprising a basic homopolymer chain having grafted thereon units or a plurality of such units of one or more polymerizable monomers, in chain form represent an interesting and important development in the resin arts, particularly since such graft copolymers find immediate and practical utility for the resin chemist to utilize them as "building block" resin systems or "module" resin systems which can be employed to "tailor-make" subsequent resin systems to quite specific industrial needs. Grafted copolymers can be made by a variety of polymerization methods including solution, emulsion or bulk polymerization and the like.

Copolymers of N-vinyl lactams, and particularly N-vinyl pyrrolidone, with various unsaturated compounds, are well known in the art and have een used in industry as coatings, textile sizes, adhesives and the like. However, in the formation of these polymers previously, it has not been possible to introduce carboxylic acid groups into the copolymers without decomposition of the N-vinyl lactam caused by a devinylation side reaction. U.S. Pat. No. 3,686,150 has, however, formed straight interpolymers thereof. Polymers containing carboxylic acid groups are highly desirable, as such groups represent a functionality useful for yielding a wide variety of products.

In another recently issued patent of the same assignee, U.S. Pat. No. 3,511,817, there is disclosed and claimed film-forming copolymers of N-vinyl lactams, e.g. N-vinyl pyrrolidone, and mono or half esters of unsaturated dicarboxylic acids, the copolymers being produced by the copolymerization of a preformed half ester of an unsaturated dicarboxylic acid, with an N-vinyl lactam in the presence of a polymerization catalyst. This is, however, only an interpolymer, and its preparation can be made only in organic reaction media, which are solvents of the interpolymer.

The present invention provides a graft emulsion terpolymer of the monomers of U.S. Pat. No. 3,686,150, the properties of which can be varied over a very wide range while still retaining the valuable carboxylic acid function.

Graft copolymers, as is well known in the art, may be prepared by the irradiation of free radical polymerization of solutions of linear homopolymers in another monomer or monomers. The reaction mechanism is believed to cause the dislodgement of hydrogen atoms or ions, forming activated centers along the homopolymer chain from which branches grow, the latter produced copolymer being in contrast to an interpolymer. Inasmuch as the graft copolymer has a much "coarser" alternation of units than does the interpolymr, the chemical properties thereof are affected. Graft copolymers tend to exhibit properties of each of the monomeric units, in contrast to interpolymers which only exhibit properties intermediate between those of the monomers.

SUMMARY OF THE INVENTION

Accordingly, it is one object of this invention to provide new graft copolymers of N-vinyl lactams and compounds which provide a carboxylic acid function in the polymer, which polymers overcome or otherwise mitigage the problems of the prior art associated therewith.

A further object of this invention is to provide graft copolymers of N-vinyl lactams, units of a half-acid or half ester of an unsaturated dicarboxylic acid and an ethylenically unsaturated monomer and stable aqueous emulsions containing same.

Another object of this invention is to provide improved polymeric materials which can be used as coatings, textile sizes, adhesives, polishes and the like and contain functional groups whic enable them to be converted to a still wider variety of products.

Further objects and advantages of the invention will become apparent from the following detailed description thereof.

According to this invention, satisfaction of these objects and advantages is achieved by the reaction of a homopolymer of (a) an N-vinyl lactam; (b) a half-acid or half ester of an unsaturated carboxylic acid; and (c) an ethylenically unsaturated compound, which graft copolymers possess properties superior to those known in the art. The polymeric comositions prepared according to this invention are high molecular weight graft copolymers of the components, the polymerization thereof being effected through the double bonds of the reactants, i.e., by vinyl polymerization.

In the polymers described in the present invention, the homopolymer of the N-vinyl lactam is in the main chain, while the side chains are composed of the units of an ethylenically unsaturatd monomer and the units of the unsaturated dibasic acid monoester. These side chain units are attached to the main chain by grafting techniques.

DESCRIPTION OF PREFERRED EMBODIMENTS

As indicated above, the polymers of this invention are prepared by the reaction of (a) a homopolymer of an N-vinyl lactam, (b) a half-acid monoester of an unsaturated dicarboxylic acid, and (c) an ethylenically unsaturated compound.

The polymeric N-vinyl lactams utilized in the preparation of the compositions of this invention are characterized by the following general structural formula:

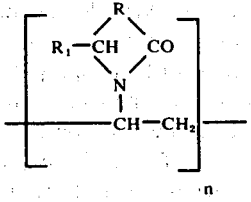

wherein R represents an alkylene bridge group necessary to complete a 5,6 or 7-membered heterocyclic ring system, $R_1$ represents either hydrogen or a methyl group, and $n$ represents a number indicative of the extent of polymerization and is usually at least 3 or 4.

All of the specific polymeric materials characterized by the foregoing general formula are commercially available and called polymeric N-vinyl lactams. They are obtained by polymerizing organic 5,6 or 7-membered ring compounds containing in their rings the —NH—CO -group, such as, for example, N-vinyl-2-pyrrolidone, N-vinyl-2-piperidone, N-vinyl-2-caprolactam, N-vinyl-3-methyl-2-pyrrolidone, N-vinyl-3-methyl-2-piperidone, or N-vinyl-3-methyl-2-caprolactam, N-vinyl-4-methyl-2-pyrrolidone, N-vinyl-4-methyl-2-piperidone or N-vinyl-4-methyl-2-caprolactam, N-vinyl-5-methyl-2-pyrrolidone, N-vinyl-5-methyl-2-piperidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5dimethyl-2-caprolactam, N-vinyl-4,6-dimethyl-2-caprolactam and N-vinyl-3,5,7-trimethyl-2-caprolactam. Of these several compounds, N-vinyl-2-pyrrolidone is most preferred as it is readily available and provides products having excellent properties.

Depending upon the extent of polymerization, they have molecular weights ranging from at least 400 up to 2,000,000 or more. Viscosity measurements are commonly used as an indication of the average molecular weight of polymeric compositions, the instant polymers being characterized by a chain of carbon atoms to which the lactam rings are attached through their nitrogen atoms:

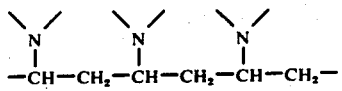

The K value (Fikentscher) of any particular mixture of polymers is calculated from viscosity data and is useful as an indication of the average molecular weight of such mixture. Its determination is fully described in "Modern Plastics", 23, No. 3, 157–61, 212, 214, 216, 218 (1945).

The number of recurring polymer units enclosed by brackets in the foregoing general structural formula, indicated by $n$, or the extent of degree of polymerization, corresponds to a chain of roughly 4 to 20,000 monomer units or more. In actual practice, a mixture of polymeric molecules, each containing a different number ($n$) of monomer units, is always produced. The polymers are readily prepared by the procedural steps given in U.S. Pat. Nos. 2,265,450; 2,317,804; and 2,335,454 in which working examples of all the species characterized by the above formula are given and all of which are incorporated herein by reference thereto.

The half esters of the unsaturated dicarboxylic acids used as copolymers in accordance with the present invention are generally half esters of lower unsaturated dicarboxylic acids, specifically half esters of such acids as: maleic, fumaric, itaconic, citraconic, mesaconic, etc. A preferred unsaturated dicarboxylic acid half ester in the half ester of maleic acid.

The ester portion of the half ester of the unsaturated dicarboxylic acid employed as a copolymer in the polymerization process of the present invention is the residue of an aliphatic, cycloaliphatic, aromatic, or heterocyclic alcohol. Thus, the ester moiety of the half ester of the unsaturated dicarboxylic acid can comprise any of the following exemplary radicals: aliphatic-methyl, ethyl, isopropyl, n-propyl, n-butyl, t-butyl, n-amyl, n-hexyl, n-heptyl n-octyl, iso-octyl, 2-ethyl-hexyl, oxo-octyl, n-nonyl, oxo-nonyl, n-decyl, iso-decyl, n-dodecyl, n-tridecyl, lauryl, stearyl, n-hexadecyl, n-octadecyl, eicosyl, etc.; cycloaliphatic-cylohexyl, etc.; aromatic-benzyl, etc.; heterocyclic-tetrahydrofurfuryl, furfuryl, etc.

Of the above, lower alkyl radicals derived from lower aliphatic alcohols are preferred.

The monoesters of the unsaturated dicarboxylic acids employed as one monomer in the polymerization of the present invention can be prepared by any process well known in the art. Thus, for example, such esters can be readily prepared by heating essentially equimolar amounts of the appropriate alcohol and the unsaturated dicarboxylic acid or anhydride at about 40° to 80°C until the monoester is prepared by esterification of one of the carboxylic groups of the unsaturated dicarboxylic acid or anhydride. Again, such process and similar processes are well known in the art.

The most highly preferred half esters for use in the present invention are the derivatives of maleic acid of the following formula:

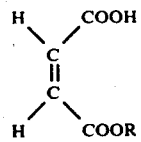

wherein R is a substituted or unsubstituted hyrocarbon group.

Representative hydrocarbon groups for R include the following:

a. Alkyl groups and substituted alkyl groups of 1 to about 18 carbon atoms, either straight or branched chain, e.g. methyl, ethyl, n-propyl, isopropyl, n-butyl, isobutyl, n-pentyl, n-hexyl, nonyl, decyl, didecyl; hydroxylalkyl, e.g. hydroxymethyl,2-hydroxyethyl 3-hydroxypropyl; haloalkyl, e.g. chloromethyl, 2-chloroethyl, 3-chloropropyl, etc. and the like; as well as unsaturated carbon chains such as alkenyl (e.g. ethenyl, propenyl, etc.) and alkynyl (e.g. propynyl, butynyl, etc.):

b. Cycloalkyl groups of 3 to about 8 carbon atoms such as cyclopropyl, cyclobutyl, cyclopentyl, cyclohexyl, cycloheptyl and cyclooctyl;

c. Aryl groups and substituted aryl groups (e.g. alkaryl) of about 6 to about 15 carbon atoms, e.g. phenyl, o-,m-and p-xylyl, tolyl, phenyl substituted by one or more alkyl groups of 1 to 7 carbon atoms, 1-naphthyl, 2-naphthyl and the like; and d. Aralkyl groups of 6 to 15 carbon atoms such as benzyl, phenethyl and the like.

Especially preferred maleates which may be used are those where R is an alkyl group of 1 to about 10 carbon atoms, such as, for example, 2-ethylhexyl maleate, because of their ease of preparation, ready availability, and the properties of products produced therefrom. The invention will be described hereinafter with respect to the maleates.

The third reactant, the ethylenically unsaturated compound, may be described as one which contains a vinyl (—C=C—) linkage in the molecule capable of undergoing vinyl polymerization. Suitable compounds useful as such monomers ae of the following formula:

wherein X is an aromatic hydrocarbon group, an aliphatic or cycloaliphatic hydrocarbon group, a nitrile group, a carboxylic acid ester group, an alcoholic ester group, an aldehyde group, a ketone group, an amide group, a heterocyclic ring group and the like.

Exemplary of X as an aromatic hydrocarbon group there may be mentioned aryl, alkaryl and arylalkyl of 6 to about 20 carbon atoms such as phenyl, biphenyl, naphthyl, alkylphenyl, e.g. tolyl, p-, m- and o-xylyl, benzyl, phenethyl and the like. Representative aliphatic hydrocarbon groups for X are alkyl of 1 to 7 carbon atoms, e.g. methyl, ethyl, n-propyl, isopropyl, n-butyl, etc. as well as cycloalkyl and carbon chains which contain additional double bond unsaturation.

Exemplary of X as an acid ester group is X of the formula:

—COOR$_3$ wherein R$_3$ is alkyl of 1 to 10 carbon atoms, cycloalkyl of 3 to 8 carbon atoms or aryl, aralkyl or alkaryl of 6 to 15 carbon atoms. Any of these groups may also be substituted with nitro, amino, halogen, nitrile, etc., groups. Alcoholic ester groups for X are those of the formula:

—OCOR$_3$ wherein R$_3$ is as above. Aldehyde groups which may be mentioned include those of the formula:

—R$_4$—CHO where R$_4$ is a single bond or the same as R$_3$ as defined above. Similarly, ketone groups are of the formula:

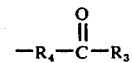

wherein R$_4$ and R$_3$ are as defined above. As amide groups, there are intended those of the formula:

—R$_4$CON(R$_3$)$_2$ wherein R$_3$ and R$_4$ are as defined above. As heterocyclic groups there are mentioned ring structures of 4 to 8 carbon atoms which also contain one or more nitrogen atoms, sulfur atoms or oxygen atoms in the ring, e.g. pyrrolidine, piperidine, pyridine, piperazine, indole, imidazole, pyran, furan, thiopyran, thiofuran and the like.

It is therefore to be understood that, in general, the ethylenically unsaturated reactant is inclusive of those monomers which contain a vinyl grouping which is subject to vinyl polymerization under the reaction conditions. Especially preferred reactants of this class are α-mono-olefins of 1 to 7 carbon atoms, e.g. ethylene, propylene, 1-butylene, 1-pentylene, etc.; arylalkenes of 8 to 15 carbon atoms, e.g. styrene, vinyl toluene, phenylethylene, etc.; the alkyl acrylates, e.g. methylacrylate, ethylacrylate, etc.; acrylonitrile, alkyl vinyl ketones, e.g. methyl vinyl ketone, ethyl vinyl ketone, etc. acrylamide and dialkyl-substituted acrylamides. Mixtures of these compounds may also be used.

While not wishing to be bound by any particular theory or mechanism of reaction, it is believed that the arrangement of the monomeric units, that is, the mono or half ester of the unsaturated dicarboxylic acid and he ethylenically unsaturated compound is an important part of the invention in relation to the polymeric N-vinyl lactam. With respect to the graft copolymers of the present invention, the above units are not situated in the main polymer chain but rather they form a more or less alternating side chain on the preformed N-vinyl lactam, such as polyvinyl pyrrolidone, which forms the skeletal chain for the addition of such monomeric units.

As pointed out above, it is believed that the arrangement of the monomer units in the final graft polymer structure, as side chains composed of said units pendant from the skeletal chain of the preformed N-vinyl lactam such as, polyvinyl pyrrolidone, represents an important aspect of the present invention and as such, the novel graft polymers can be readily and conveniently prepared by subjecting a suitable mixture of an N-vinyl lactam, such as poly N-vinylpyrrolidone and monomeric units to polymerization conditions whereby vinyl-type polymerization occurs through the ethylenically unsaturated groups of the monomers. Such means of vinyl-type polymerizations are well known in the art and include inducing means for initiating polymerization such as the use of high energy radiation including gamma radiation, X-rays and the like or by the use of a free radical type catalyst such as a free radical producing redox-system, which is preferred.

Broadly speaking, the invention includes the provision of a graft copolymer of a monomer mixture comprising approximately by weight a. 5 to 50% of a monomer having the formula

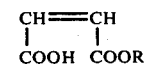

wherein R is a substituted or unsubstituted hydrocarbon group; and b. 5 to 85% of a monomer having the formula

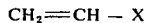

wherein X is an aromatic, aliphatic or cycloaliphatic hydrocarbon group, a nitrile group, a carboxylic acid ester group, an alcoholic acid ester group, an aldehyde group, a ketone group, an amide group or a heterorycliec ring group, graft polymerized on a poly (n-vinyl lactam) substrate; a stable aqueous emulsion containing same, a latex derived therefrom and a process for producing both the emulsion and the graft copolymer.

The graft copolymer system described in the present invention can be varied over a wide range by:
a. changing the ratio of the comonomers;
b. varying the ester-group of the maleate;
c. using various ethylenically unsaturated compounds with different substituents on the —CH=CH$_2$ group; and
d. the combination of (a) to (c).

It will be seen therefore that the resulting graft copolymer with units containing the carboxylic acid group as well as the ethylenic compound provide functionalities through which the polymers may be subjected to various chemical reactions to yield a variety of products. Thus, the polymers of the invention provide a wide and flexible range of properties for film-forming polymers.

The ratio of each of these reactants may be varied as desired over a wide range consistent with attainment of the desired properties. However, for obtaining optimum properties of the polymers, the following ratios by weight of the monomers are preferred:

| Monomer | Parts by weight |
|---|---|
| Poly (N-Vinyl lactam) | 10 to 90 |
| Dicarboxylic acid half ester | 5 to 50 |
| Ethylene compound | 5 to 85 |

For the preparation of the graft polymers of the invention, the polymer first has to be activated with a water soluble activator (e.g., ammonium persulfate) at elevated temperatures. This treatment creates active sites along the polymer chain, rendering it suitable for the attachment of monomeric units by grafting. The monomer is introduced into the reaction system containing the activated polymeric N-vinyl lactam, such as poly N-vinyl pyrrolidone. Where permissible, it is preferred to carry out the reaction by dissolving or dispersing the reactants in an aqueous solution in the desired concentrations in the presence of a catalyst for initiation of polymerization. In addition to free radical producing redox catalyst systems, which are preferred for use herein, other catalysts can be employed and include per-compounds such as organic and inorganic peroxides, for example, benzoyl peroxide, cumene hydroperoxide, hydrogen peroxide, acetyl peroxide, lauroxyl peroxide or persulfates, for example, alkali metal persulfates such as sodium and potassium persulfates, ammonium persulfate and the like, perborates, such as, sodium, potassium and ammonium perborates as well as azobisnitriles, such as azo bis-isobutylnitrile. If desired, mixtures of catalysts can be employed.

The catalyst concentration in the reaction system is not necessarily a critical feature of the invention. The amount of catalyst can be varied over a wide range, but, advantageously, an amount of catalyst of from about 0.01 to 2.0 weight percent or more can be employed, based on the total weight of reactants being polymerized.

The temperature at which the reaction is advantageously carried out can be varied over a wide range of from about -10°C and lower to about 180°C and higher, however, it is preferred to conduct the graft polymerization reaction at a temperature of about 70°–95°C in order to avoid an undesirably violent reaction. Graft polymerization temperatures of about 80°C provide products having the desirable physical characteristics of latex viscosity and molecular weight.

The graft polymerization reaction is normally carried out in a reaction vessel under the pressure of the monomers at any given reaction temperature, however, if desired, the pressure may be increased by the introduction of an inert gas such as nitrogen or argon and the like. Additionally, the reaction is preferably carried out in the absence of free oxygen in order to provide optium conditions for the graft polymerization reaction.

If desired, an activating agent such as an alkali metal sulfite or bisulfite, e.g., sodium, potassium, etc., sulfites and metabisulfites can be added to the polymerization reaction mixture in about the same amount as the polymerization catalyst in which case lower polymerization temperatures may be used. Chain regulators such as hexyl, cetyl, dodecyl, myristyl, etc., mercaptans can also be employed in the polymerizations. Suitable surface-active agents include fatty acid soaps, fatty alcohol sulfates such as sodium lauryl sulfate, potassium lauryl sulfate, etc., alkali metal salts of aromatic sulfonic acids, e.g., sodium isobutylnaphthalene sulfonate, etc., sulfosuccinic esters, a-stearaminopropyl, dimethyl β-hydroxyethyl ammonium chloride, and the like.

The emulsions can be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids, although it has been observed that it is preferable to add such materials to the emulsion recipe in order to obtain high conversions and greater stability of the resultant emulsions.

These polymers, as indicated above, are useful as coatings, sizes, polishes, adhesives and in similarly related applications.

The following examples illustrate the invention but are not to be considered as limiting the same. In the examples, parts and percentages are by weight unless otherwise designated.

EXAMPLE I

Apparatus: A two-liter kettle equipped with thermometer, mechanical stirrer, reflux condenser, gas inlet tube and dropping funnel.

Procedure: To a solution made by dissolving 192 g of PVP (K-30) in 715 g distilled water, 12 g nonylphenoxy poly(ethyleneoxy) ethanol (Igepal CO-630) and 3 g sodium acetate are added. The system is purged with nitrogen, and the temperature is raised to 60°C. At this point, 2.2 g ammonium persulfate are added, and the heating is continued. The mixture is kept at 100°C for 30 minutes, after which the temperature is lowered to 70°C. A mixture consisting of 260 g ethylacrylate, 28 g 2-ethylhexyl maleate and 12 g Igepal is placed in a dropping funnel. Ten weight percent of this mixture is added to the kettle at 70°C in 5 minutes. The mixture is stirred for another 10 minutes. After that, 5 g of 5% ammonium persulfate is added. The addition of the rest of the monomers is started immediately and is completed in 1 hour. The temperature is maintained for another hour, then the temperatures are lowered to 25°C and the latex is discharged through cheesecloth.

EXAMPLE II

Apparatus: as described in Example I.

| Ingredients: | 715 g distilled water |
| --- | --- |
| | 192 g PVP/K-30 |
| | 24 g Igepal CO-630 |
| | 3 g sodium acetate |
| | 2.2 g ammonium persulfate (100%) |
| | 5 g ammonium persulfate (5%) |
| | 260 g butylacrylate |
| | 28 g amyl maleate |

Procedure: similar to Example I.

EXAMPLE III

Apparatus: As described in Example I.

| Ingredients: | 600.0 g Distilled water |
| --- | --- |
| | 120.0 g PVP/K-30 |
| | 5.6 g Gafac RE-610 |
| | 3.6 g Sodium acetate |
| | 1.8 g Ammonium persulfate 100% |
| | 0.8 g Ammonium persulfate 5% |
| | 84.0 g Monoethyl maleate |
| | 196.0 g Vinylacetate |

Procedure: A solution made by dissolving PVP, surfactant and sodium acetate in distilled water is placed in the reaction vessel. The system is purged with nitrogen, then it is heated to 60°C. At this temperature, 1.8 g ammonium persulfate is introduced, and the heating is continued up to 100°C. The latter temperature is maintained for 30 minutes. After that, the temperature is lowered to 70°C, and addition of the monomer mixture is started. One-third of the monomers is added in 40 minutes, the mixture is agitated for 10 minutes, and then 0.8 g of 5% ammonium persulfate is added. The mixture is allowed to react for 10 minutes, then addition of the monomers is resumed. The addition of monomers and catalyst is repeated two more times. When addition is over, the temperature is held for 1 hour, then another 0.8 g of 5% catalyst solution is added. One hour later the system is cooled to 25°C and the product - a milky, white emulsion - is discharged through a cheese-cloth.

EXAMPLE IV

Apparatus: As described in Example I.

| Ingredients: | 600.0 g Distilled Water |
| --- | --- |
| | 120.0 g PVP/K-30 |
| | 8.0 g Igepal CO-970 |
| | 2.8 g Sodium acetate |
| | 1.4 g Ammonium persulfate 100% |
| | 1.8 g Ammonium persulfate 5% |
| | 168.0 g Mono-butylmaleate |
| | 216.0 g Styrene |

Procedure: PVP/K-30, Igepal CO-970 and sodium acetate are dissolved in the distilled water. The system is purged thoroughly with nitrogen, and then the contents of the kettle are heated to 60°C. At this temperature, 1.4 g ammonium persulfate is introduced. The temperature is raised to 100°C, which is maintained for 30 minutes. After that, the temperature is lowered to 90°C, and addition of the monomers is started. About one-third of the latter is introduced over a 45 minute period. Then the mixture is stirred for 15 minutes. Five percent ammonium persulfate, 1.8 g is added, and the monomer addition is resumed. The addition of monomers and catalyst is repeated twice more. When the addition is over, the mixture is allowed to react for 2 hours. Finally the emulsion is cooled to 25°C, and is discharged through a cheese-cloth.

In a similar manner other polymeric N-vinyl lactams and monomeric substituents of the class described, supra, can be employed with similar results obtaining.

EXAMPLE V

Apparatus: 2-liter resin kettle equipped with thermometer, mechanical stirrer, reflux condenser, gas inlet tube and dropping funnel.

Procedure: To a solution made by dissolving 192 g PVP (K-30) in 686g. distilled water, 14g. "Igepal" CO-630 and 2.4g. sodium acetate are added. The system is purged with nitrogen and the temperature raised to 60°C. At this temperature, 2.0g solid ammonium persulfate is introduced, and the heating continued to 100°C. This temperature is held for 30 minutes, and then the system is cooled to 70°C. A mixture of 242.4g. styrene, 45.6g 2-ethyl-hexylmaleate and 10g Igepal CO-630 is placed in a dropping funnel. Ten percent of this solution is added to the PVP solution over a 5 minute period; and the mixture is thereafter agitated for 10 minutes. Then 4.8g of a 5% ammonium persulfate solution is added thereto. The addition of the monomer mixture is started and added over a 1 hour period at 70°C. The temperature is increased to 90°C, and the reaction is finished by three consecutive additions of 1g di-t-butyl peroxide (introduced 3 hours apart).

EXAMPLE VI

Apparatus: As described in Example V.

Procedure: To a solution of 192g PVP (K-30) in 715g distilled water, 14g Igepal CO-630 and 2.4g sodium acetate are added. The system is purged and the temperature raised to 60°C. At this temperature, 2.0g ammonium persulfate is added, and the temperature raised to 100°C. It is so held for 30 minutes, and then the temperature is lowered to 70°C. From a mixture consisting of 192g vinyltoluene, 96g mono-amyl maleate and 10g Igepal CO-630, 30g thereof is added to the PVP-solution over a 5 minute period. The mixture is stirred for 15 minutes, then 0.5g di-t-butyl peroxide is added, and the mixture is maintained at 70°C for one-half hour. Then the rest of the monomers are added over a 1 hour period. After the addition is over, the temperature is raised to 90°C and 1g di-t-butyl peroxide is added. The catalyst addition is repeated 1 hour later. After one more reaction hour, the resultant milky, white latex is discharged through cheese-cloth.

In a similar manner, other polymeric N-vinyl lactams, half esters and arylalkene compounds of the class described, supra, can be employed with similar results obtaining.

It is obvious that numerous changes and modifications can be made in the invention without departing from the spirit and scope thereof, and all such obvious modifications are considered to be within the scope of the invention.

We claim:
1. A graft copolymer derived from a monomer mixture comprising, approximately by weight.

a. 5 to 50% of a monomer having the formula

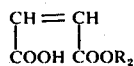

wherein $R_2$ is selected from the group consisting of substituted and unsubstituted $C_1$–$C_{18}$ alkyl, $C_3$–$C_8$ cycloalkyl, substituted and unsubstituted $C_6$–$C_{15}$ aryl; and b. 5 to 95% of an unsaturated ethylenic monomer having the formula

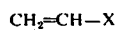

wherein X is a moiety selected from the group consisting of an ester, aldehyde, ketone, halogen, ether, nitrile, isocyanate, sulfate and its salts, an N-containing heterocycle, and an aromatic hydrocarbon containing from 6 to about 20 carbon atoms, the monomers of said monomer mixture having been grafted on a poly (N-vinyl lactam) substrate having the formula

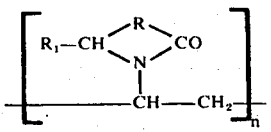

wherein R represents an alkylene bridge group containing from 2 to 4 carbon atoms, $R_1$ represents a member selected from the group consisting of hydrogen and methyl and $n$ represents the number of N-vinyl lactam units, said substrate being present in an amount of about 10% to about 90% by weight of said graft copolymer.

2. A graft copolymer according to claim 1, wherein the monomer of (a) is half ester of an unsaturated dicarboxylic acid selected from the group consisting of maleic and fumaric acids and an alcohol selected from the group consisting of $C_1$–$C_{18}$ alkyl, $C_3$–$C_8$ cycloalkyl, and substituted and unsubstituted $C_6$–$C_{15}$ aryl, alcohols.

3. A graft copolymer according to claim 1, wherein said unsaturated ethylenic monomer is an arylalkene monomer of the formula

wherein $R_3$ and $R_4$ are selected from the group consisting of H and $C_1$ – $C_7$ alkyl and X is an integer of 1 to 5.

4. A graft copolymer according to claim 1, wherein said substrate is present in an amount of about 20% to about 60% by weight of said graft copolymer.

5. A graft copolymer according to claim 1 wherein $R_2$ is selected from the group consisting of methyl, ethyl, n-propyl, isopropyl, n-butyl, isobutyl, n-pentyl, n-hexyl, n-octyl, nonyl, decyl, dodecyl, tridecyl, octadecyl, ethenyl, propenyl, chloromethyl, chloroethyl, cyclopropyl, cyclobutyl, cyclopentyl, cyclohexyl, cycloheptyl, cyclooctyl, phenyl, tolyl, o-, m-, and p-xylyl, 1-naphthyl, 2-naphthyl, benzyl, and phenethyl.

6. A graft copolymer according to claim 1, wherein the unsaturated ethylenic monomer is selected from the group consisting of vinyl acetate, an acrylate, styrene, and vinyl toluene and said poly (N-vinyl lactam) is poly (N-vinyl pyrrolidone).

7. A graft copolymer according to claim 6, wherein the unsaturated ethylenic monomer is vinyl acetate.

8. A graft copolymer according to claim 6, wherein the unsaturated ethylenic monomer is an acrylate.

* * * * *